United States Patent [19]

Glaser

[11] Patent Number: 4,826,727

[45] Date of Patent: May 2, 1989

[54] PHOSPHORESCENT MATERIAL FOR ELECTROLUMINESCENT DISPLAY, COMPRISING SILVER SULFIDE IN COPPER SULFIDE COATING ON PHOSPHOR PARTICLES AND/OR ELEMENTAL SULFUR IN DIELECTRIC BINDER FOR PHOSPHOR PARTICLES

[75] Inventor: David Glaser, El Paso, Tex.

[73] Assignee: The Cherry Corporation, Waukegan, Ill.

[21] Appl. No.: 38,697

[22] Filed: Apr. 14, 1987

Related U.S. Application Data

[63] Continuation-in-part of Ser. No. 752,317, Jul. 3, 1985, abandoned, and Ser. No. 24,982, Mar. 12, 1987.

[51] Int. Cl.[4] .................................... H01J 29/20
[52] U.S. Cl. .................................... 428/403; 428/917; 428/690; 252/301.45
[58] Field of Search .............. 428/690, 691, 917, 323, 428/407, 403

[56] References Cited

U.S. PATENT DOCUMENTS

| | | | |
|---|---|---|---|
| 3,708,708 | 1/1973 | Soxman | 313/108 |
| 3,731,353 | 5/1973 | Vecht | 29/25.13 |
| 3,869,646 | 3/1975 | Kirton et al. | 315/246 |
| 3,984,586 | 10/1976 | Kawarada et al. | 427/64 |
| 4,140,937 | 2/1979 | Vecht et al. | 313/503 |
| 4,377,769 | 3/1983 | Beatty et al. | 313/495 |
| 4,486,499 | 12/1984 | Morimoto | 428/690 X |
| 4,539,506 | 9/1985 | Ohtani et al. | 428/690 X |
| 4,680,231 | 7/1987 | Yamaura et al. | 428/690 X |

FOREIGN PATENT DOCUMENTS 2239513 2/1975 France .

OTHER PUBLICATIONS

A. G. MacDiarmid, "Synthesis and Selected Properties of Polymeric Sulfur Nitride, (Polythiazyl), (SN)x", Chapter 6 in R. B. King, ed. *Inorganic Compounds with Unusual Properties*, Advances in Chemistry Series, No. 150, American Chemical Society (1976).

C. M. Mikulski et al., "Synthesis and Structure of Metallic Polymeric Sulfur Nitride, (SN)x, and its Precursor, Disulfur Dinitride, $S_2N_2$", *Journal of the American Chemical Society*, 97,6358–63 (1975).

E. L. Tannis, *Electroluminescent Displays*, chapter 8 in E. L. Tannis, *Flat-Panel Displays and CRTs* (1984).

A. Vecht et al., "Direct-Current Electroluminescence in Zinc/Sulfide: State of the Art", Proceedings of the IEEE, 61, 902–07 (1973).

*Primary Examiner*—Nancy A. B. Swisher
*Attorney, Agent, or Firm*—Willian Brinks Olds Hofer Gilson & Lione Ltd.

[57] ABSTRACT

Electroluminescent display panels comprising copper sulfide coated Zns:Mn phosphor powder, bonded in an organic dielectric binder, can be provided with increased useful lives by incorporating (1) silver in the copper sulfide coating on the ZnS:Mn phosphor powder, in an amount of 2 to 12%, by weight of the copper in the copper sulfide coating; and (2) elemental sulfur in the dielectric binder, in an amount of 0.1 to 3%, by weight of the phosphor particles. The additives can be used independently or together, preferably together. Methods of incorporating the additives are also disclosed.

26 Claims, 1 Drawing Sheet

PHOSPHORESCENT MATERIAL FOR ELECTROLUMINESCENT DISPLAY, COMPRISING SILVER SULFIDE IN COPPER SULFIDE COATING ON PHOSPHOR PARTICLES AND/OR ELEMENTAL SULFUR IN DIELECTRIC BINDER FOR PHOSPHOR PARTICLES

CROSS-REFERENCES TO RELATED APPLICATIONS

This is a continuation-in-part of application Ser. No. 752,317, filed July 3, 1985, by David Glaser, and now abandoned; and of application Ser. No. 24,982, filed March 12, 1987, by Walter L. Cherry and David Glaser, entitled ELECTROLUMINESCENT DISPLAY WITH INTERLAYER FOR IMPROVED FORMING. Improvements of the invention of Ser. No. 752,317 are disclosed and claimed in application Ser. No. 849,768, filed Apr. 9, 1986, by David Glaser now abandoned, entitled PHOSPHORESCENT MATERIAL FOR ELECTROLUMINESCENT DISPLAY, HAVING DECREASED TENDENCY FOR FURTHER FORMING.

BACKGROUND OF THE INVENTION

This invention relates to a phosphorescent material for electroluminescent display. More particularly, it relates to improvements in the composition of the phosphorescent layer of a zinc sulfide powder phosphor electroluminescent display panel, such as a matrix display panel or a segmented display panel, especially such a panel intended for operation in the direct current (DC) mode; but also applicable to display panels intended for operation in the alternating current (AC) mode.

Electroluminescence is the emission of light from a crystalline phosphor due to the application of an electric field. A commonly used phosphor material is zinc sulfide activated by the introduction of less than one mole percent of various elements such as manganese into its lattice structure. When such a material is subjected to the influence of an electric field of a sufficient magnitude, it emits light of a color which is characteristic of the composition of the phosphor. Zinc sulfide activated with manganese (referred to as a zinc sulfide:-manganese or ZnS:Mn phosphor) produces a pleasant yellowish orange centered at 585 nanometers (nm) wavelength.

ZnS:Mn phosphors are characterized by high luminance, luminous efficiency and discrimination ratio, and long useful life. Luminance is brightness or luminous intensity when activated by an electric field, and is commonly measured in lamberts, i.e. candelas per pi square centimeters, or in foot-lamberts, i.e. candelas per pi square feet. Luminous efficiency is light produced compared to power consumed by the device, commonly measured in lumens per watt. Discrimination ratio is the ratio of luminance in response to an "on" voltage to luminance in response to an "off" voltage.

A wide range of colors can be obtained by substituting or supplementing the manganese with other materials such as copper or alkaline earth activators, or by substituting or supplementing the zinc sulfide with other similar phosphorescent materials such as zinc selenide.

Phosphor materials can be formulated into a wide variety of electroluminescent configurations to serve numerous functions. In many electroluminescent devices the electroluminescent display is a panel which is divided into a matrix of individually activated pixels (picture elements).

Two major subdivisions of electroluminescent devices are AC and DC intended operating mode. In DC configurations, electrons from an external circuit pass through the pixels in the panel. In AC configurations, the pixels are capacitatively coupled to an external circuit.

Electroluminescent devices are also made using either powder or thin-film phosphor configurations. Powder phosphors are formed by precipitating powder phosphor crystals of the proper grain size, suspending the powder in a lacquer-like vehicle, and then applying the suspension to a substrate, for example by spraying, screening or doctor-blading techniques. Thin-film phosphors are grown from condensation of evaporants from vacuum vapor depositions, sputtering, or chemical vapor depositions.

Two configurations to which the present invention has high applicability are the powder phosphor electroluminescent matrix and segmented display panels, intended for operation in the direct current (DC) mode. Matrix display panels can be used for a variety of applications, and in general, can find utility as substitutes for cathode ray tubes (CRTs), wherever CRTs are used. For example, matrix display panels can be used for such applications as oscilloscopes, television sets and monitors for computers. A particularly advantageous application for the matrix display panel is as the monitor for a microcomputer, or personal computer. By avoiding the need for a CRT, an electroluminescent matrix display panel can make a personal computer more compact and thus more easily portable.

Segmented display panels find utility for example as alphanumeric displays in such apparatus as digital clocks; pocket calculators; and gasoline pump indicators for price, volume delivered and cost of amount delivered.

The use of electroluminescent matrix display panels as monitors for personal computers, and for various other applications, is known. Electroluminescent display panels, however, are subject to various modes of degradation after a period of use, and in due course the panels must be replaced.

It is, therefore, a purpose of this invention to provide an electroluminescent material for use in electroluminescent display panels, having increased useful life.

SUMMARY OF THE INVENTION

A phosphorescent material according to the prior art, for use in an electroluminescent display panel such as an electroluminescent matrix display panel, comprises:

(a) phosphor particles of a size from about 0.1 to about 2.5 microns, comprising zinc sulfide containing from about 0.1 to about 1.0% by weight manganese;

(b) a coating of copper sulfide on the phosphor particles; and (c) a dielectric binder.

The present invention provides the improvements which comprise the addition, in the coating of copper sulfide on the phosphor particles, of from about 2 to about 12% of silver, by weight of the copper in the coating of copper sulfide on the phosphor particles; and the addition, in the dielectric binder, of from about 0.1 to about 3% of elemental sulfur, by weight of the phosphor particles. The additions can be made independently, but are preferably used in combination.

An electroluminescent display panel according to the prior art comprises:

(1) a transparent, flat, electrically nonconductive substrate;

(2) at least one anode, applied to one side of the transparent electrically nonconductive substrate;

(3) a phosphorescent layer from about 15 to about 40 microns thick, comprising at least one phosphor element, applied to one side of the transparent electrically nonconductive substrate, in electrical contact with the anode, each phosphor element comprising:

(a) phosphor particles of a size from about 0.1 to about 2.5 microns, comprising zinc sulfide containing from about 0.1 to about 1.0%, preferably 0.4%, by weight manganese;

(b) a coating of copper sulfide on the phosphor particles; and (c) a dielectric binder; and (4) at least one conductive cathode, each cathode being in electrical contact with a phosphor element.

In the case of an electroluminescent matrix display panel, the device comprises:

(1) a transparent, flat, electrically nonconductive substrate;

(2) a plurality of mutually parallel transparent electrically conductive anodes, applied to one side of the transparent electrically nonconductive substrate;

(3) a phosphorescent layer from about 15 to about 40 microns thick, comprising a plurality of mutually parallel phosphor elements, applied to one side of the transparent electrically nonconductive substrate, over the transparent electrically conductive anodes, in a direction oblique to the transparent, electrically conductive anodes, each phosphor element comprising (a) phosphor particles of a size from about 0.1 to about 2.5 microns, comprising zinc sulfide containing from about 0.1 to about 1.0%, preferably 0.4%, by weight manganese;

(b) a coating of copper sulfide on the phosphor particles; and (c) a dielectric binder; and (4) a plurality of mutually parallel electrically conductive cathodes, each cathode being applied to a phosphor element.

An improvement provided by the invention is the addition of silver, in the coating of copper sulfide on the phosphor particles, in an amount from about 2 to about 12%, by weight of the copper in the coating of copper sulfide on the phosphor particles.

Another improvement provided by the invention, which may be implemented with or without the addition of silver mentioned above, is the addition of elemental sulfur, in the dielectric binder, in an amount from about 0.1 to about 3% by weight of the phosphor particles.

An electroluminescent matrix display panel according to the prior art can be made by a method which comprises:

(1) applying a plurality of mutually parallel transparent electrically conductive anodes, to one side of a transparent electrically nonconductive substrate;

(2) preparing a homogeneous powder of zinc sulfide crystals containing from about 0.1 to about 1.0% by weight manganese, to obtain crystal grains of a size between 0.1 and 2.5 microns;

(3) immersing the crystal grains in an aqueous salt solution containing a salt selected from the group consisting of copper chloride and copper nitrate, whereby to effect a surface replacement of zinc with copper and to yield zinc sulfide:manganese particles coated with copper sulfide;

(4) filtering from the solution, rinsing and drying the coated zinc sulfide:manganese particles;

(5) mixing dielectric binder with sufficient amount of a thinner to provide the dielectric binder with a viscosity enabling a mixture of the dielectric binder, thinner and the zinc sulfide:manganese particles coated with copper sulfide to be applied to the transparent electrically nonconductive substrate;

(6) mixing the mixture of dielectric binder and thinner with the zinc sulfide:manganese particles coated with copper sulfide;

(7) applying the mixture of dielectric binder, thinner and zinc sulfide:manganese particles coated with copper sulfide on the transparent electrically nonconductive substrate, over the parallel transparent electrically conductive anodes, and in stripes which are parallel to each other but oblique to the angle of the parallel transparent electrically conductive anodes;

(8) evaporating the thinner from the mixture of dielectric binder, thinner and zinc sulfide:manganese particles coated with copper sulfide, to leave a series of stripes of dielectric binder and zinc sulfide:manganese particles coated with copper sulfide;

(9) applying cathodes, one cathode over each stripe of dielectric binder and zinc sulfide:manganese particles coated with copper sulfide; and

(10) passing a sufficient forming current through the cathodes, dielectric binder and zinc sulfide:manganese particles coated with copper sulfide and anodes to render sections of the stripes of dielectric binder and zinc sulfide:manganese particles coated with copper sulfide into a matrix of electroluminescent pixels.

An improvement provided by the invention which requires the use of copper nitrate as the aqueous salt solution, is the addition, in the copper nitrate, of sufficient quantity of silver nitrate to provide silver n the coating of copper sulfide on the phosphor particles, in an amount of from about 2 to about 12%, by weight of the copper in the coating of copper sulfide on the phosphor particles.

Another improvement provided by the invention, which can be implemented using either copper chloride or copper nitrate, is the addition, in the thinner for the dielectric binder, of elemental sulfur, in an amount sufficient to provide from about 0.1 to about 3% of elemental sulfur by weight of the phosphor particles.

The dielectric binder can be organic, such as nitrocellulose; or it can be inorganic, such as tin sulfide or a ceramic material. Nitrocellulose is available in a nitrocellulose lacquer containing nitrocellulose and solvent, and is preferred.

DETAILED DESCRIPTION

Figure 1:
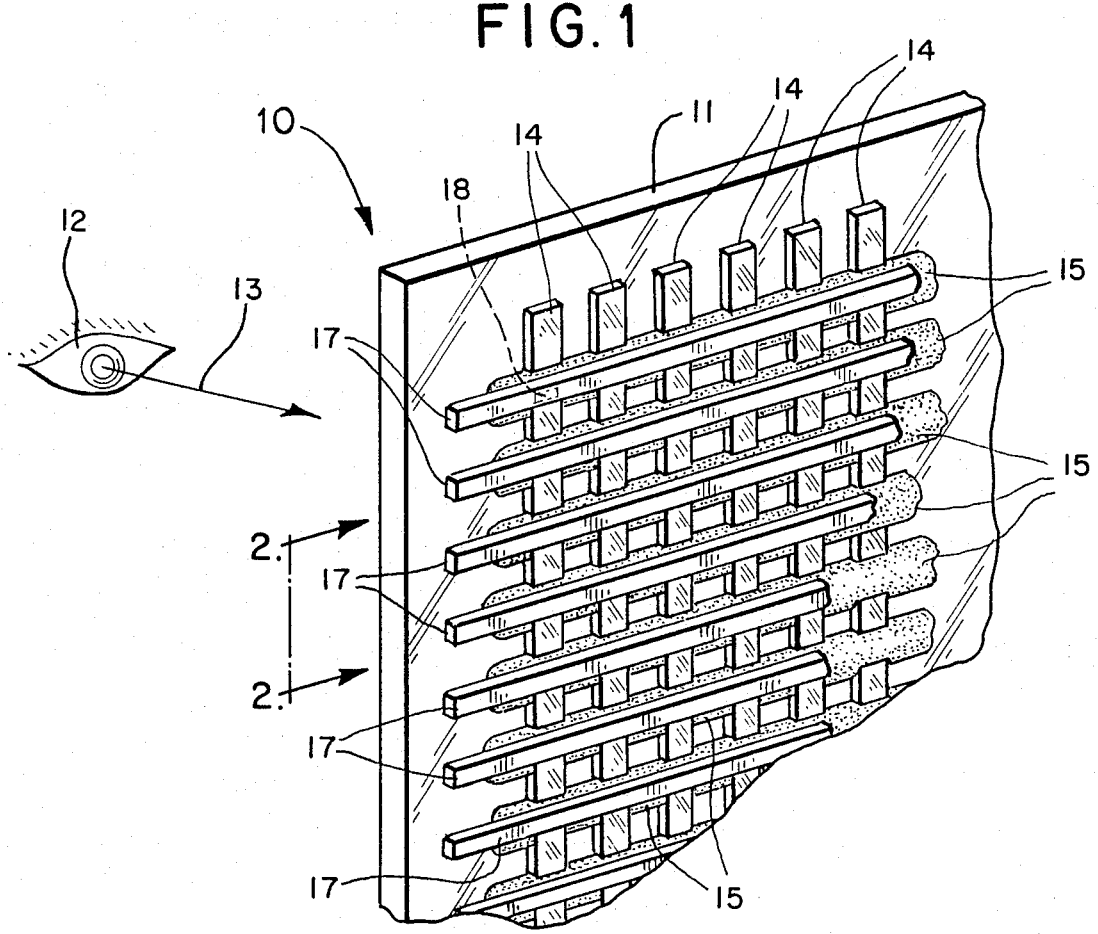
FIG. 1 is a schematic representation, in perspective, of an electroluminescent matrix display panel according to the invention.
Figure 2:
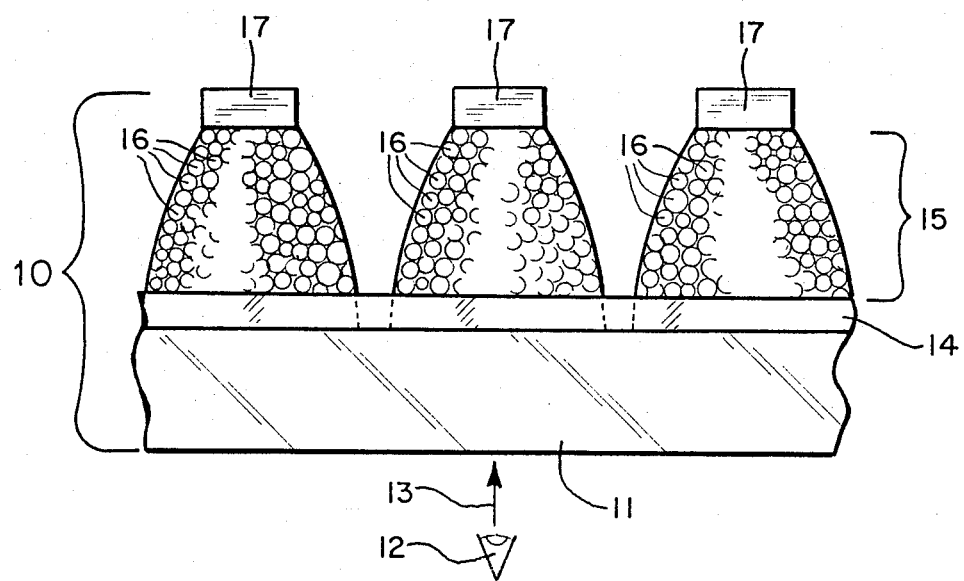
FIG. 2 is an expanded end view of the electroluminescent matrix display panel of FIG. 1, illustrating detail of its construction, and taken along line 2—2 of FIG. 1.

The electroluminescent matrix display panel shown in FIG. 1 is in a position opposite that in which it would be seen by a viewer in actual use. A portion of the panel is shown in FIG. 2 in a position perpendicular to that in which it would be seen by a viewer in actual use.

Panel 10 consists of a substrate 11 upon which are deposited, on one side, various components hereinafter described. Those components produce electroluminescence at the interface between those components and substrate 11. The electroluminescent matrix display panel is intended for viewing by observer 12 through substrate 11, along line of sight 13.

The general structure and operation of electroluminescent matrix display panels are known in the prior art; see for example E. L. Tannas, *Electroluminescent Displays,* chapter 8 in E. L. Tannas, Ed., *Flat-Panel Displays and CRTs* (1984); Vecht, U.S. Pat. No. 3,731,353; Kirton et al., U.S. Pat. No. 3,869,646; and Vecht et al., U.S. Pat. No. 4,140,937. The following explanation, however, will allow an understanding of the invention without reference to the prior art.

Substrate 11 is transparent, flat and electrically nonconductive. The preferred materials for substrate 11 are glasses such as soda-lime glass and borosilicate glass.

A plurality of mutually parallel transparent electrically conductive anodes 14 are applied to one side of the transparent electrically nonconductive substrate 11. Anodes 14 can be tin oxide or indium-tin oxide.

A phosphorescent layer from about 15 to about 40 microns thick, preferably about 25 microns thick, comprising a plurality of mutually parallel phosphor elements 15, is applied to one side of the transparent electrically nonconductive substrate 11, over the transparent electrically conductive anodes 14. The direction of application of the mutually parallel phosphor elements 15 is oblique, and preferably perpendicular, to the transparent, electrically conductive anodes 14.

Phosphor elements 15 comprise phosphor particles 16 (see FIG. 2) of a size from about 0.1 to about 2.5 microns; and a dielectric binder. The phosphor particles 16 comprise zinc sulfide containing from about 0.1 to about 1.0%, preferably about 0.4%, by weight manganese; preferably also about 0.05% by weight copper; and a coating of copper sulfide on the phosphor particles. The dielectric binder is, according to one preference, organic, such as nitrocellulose. As noted above, an inorganic binder such as tin sulfide or a ceramic material could also be used.

According to the invention there are also provided the improvements which comprise the addition, in the coating of copper sulfide on the phosphor particles 16, of from about 2 to about 12%, preferably from about 5 to about 10%, and more preferably about 8%, of silver, by weight of the copper in the coating of copper sulfide on the phosphor particles; and the addition, in the organic dielectric binder, of from about 0.1 to about 3%, preferably about 0.1 to about 0.3%, and most preferably about 0.2%, of elemental sulfur, by weight of the phosphor particles.

The silver in the coating of copper sulfide is in the form of silver sulfide. In specifying the amounts of silver present, however, the calculations are made on the basis of relative weights of silver and copper in the coating.

A plurality of mutually parallel electrically conductive cathodes 17, preferably of aluminum, is applied over the phosphor elements 16, each cathode 17 being applied to a phosphor element 16. By indicating that the phosphor elements 16 are applied in stripes, and that cathodes 17 are applied over phosphor elements 16, it is intended to specify the configuration ultimately provided for the phosphor elements 16 and the positioning of the cathodes 17, not the order in which the device is constructed. It is convenient to apply phosphor particles and binder as a sheet and aluminum for the cathodes 17 in another sheet, and then to scribe both simultaneously to form phosphor elements 16 and cathodes 17. As is known in the art, there are also other methods of simultaneously forming individual phosphor elements and electrodes, which can also be used.

Current will later flow between cathodes 17 and anodes 14, first to render sections of the stripes of organic dielectric binder and zinc sulfide:manganese particles coated with copper sulfide into a matrix of electroluminescent pixels 18, and later to cause those pixels 18 to luminesce. The current will flow in the most direct path between the cathodes 17 and anodes 14, i.e. in the square columnar parts of the phosphor elements 15 which are within the squares which are defined at one end by the width of the anodes 14, and on the other end by the width of cathodes 17. Each such square columnar part of phosphor elements 15 is a pixel 18. Each pixel 18 may be caused to luminesce independently, by circuitry known in the art to sequentially address each combination of cathodes 17 and anodes 14 on a time division multiplexing basis.

The anodes 14 and cathodes 17 are preferably each spaced so as to provide about 10 pixels per square millimeter, or about 1000 pixels per square centimeter.

Electroluminescent matrix display panels 10 can be made, according to the prior art, by:

(1) applying a plurality of mutually parallel transparent electrically conductive anodes 14, preferably tin oxide or indium-tin oxide, to one side of a transparent electrically nonconductive substrate 11, preferably soda-lime or borosilicate glass;

(2) preparing a homogeneous powder of zinc sulfide crystals containing from about 0.1 to about 1.0%, preferably about 0.4%, by weight manganese, and preferably also about 0.05% copper, to obtain crystal grains of a size between 0.1 and 2.5 microns;

(3) immersing the crystal grains in an aqueous salt solution containing a salt selected from the group consisting of copper chloride and copper nitrate, whereby to effect a surface replacement of zinc with copper and to yield zinc sulfide:manganese particles coated with copper sulfide;

(4) filtering from the solution, rinsing and drying the coated zinc sulfide:manganese particles;

(5) mixing dielectric binder with sufficient amount of a thinner to provide the dielectric binder with a viscosity enabling a mixture of the dielectric binder, thinner and the zinc sulfide:manganese particles coated with copper sulfide to be applied to the transparent electrically nonconductive substrate;

(6) mixing the mixture of dielectric binder and thinner with the zinc sulfide:manganese particles coated with copper sulfide;

(7) applying the mixture of dielectric binder, thinner and zinc sulfide:manganese particles coated with copper sulfide on the transparent electrically nonconductive substrate 11, over the parallel transparent electrically conductive anodes 14, and in stripes 15 which are parallel to each other but oblique, preferably perpendicular, to the angle of the parallel transparent electrically conductive anodes 14;

(8) evaporating the thinner from the mixture of dielectric binder, thinner and zinc sulfide: manganese particles coated with copper sulfide, to leave a series of stripes 15 of dielectric binder and zinc sulfide: manganese particles coated with copper sulfide;

(9) applying cathodes 17, one cathode over each stripe 15 of dielectric binder and zinc sulfide: manganese particles coated with copper sulfide; and

(10) passing a sufficient forming current through the cathodes 17, dielectric binder and zinc sulfide:manganese particles coated with copper sulfide and anodes 14 to render sections of the stripes of dielectric binder and zinc sulfide:manganese particles coated with copper sulfide into a matrix of electroluminescent pixels 18.

The process of preparing a homogeneous powder containing crystals of zinc sulfide and manganese, preferably also copper, is well known in the art; but briefly stated, one such process comprises preparing a solution of zinc acetate and adding a precipitating agent such as thioacetamide to precipitate a powder of zinc sulfide; and then doping the zinc sulfide with manganese sulfide and copper sulfide in the desired proportions (0.4% manganese sulfide and 0.05% copper sulfide). The precipitate is then washed in deionized water, fired for about half an hour in an inert atmosphere in a silica crucible at 960° C. to recrystallize the zinc sulfide and activate the powder; washed in acetic acid to remove unwanted oxide impurities, rinsed in deionized water, dried and sieved; coated with copper sulfide; and again washed, dried and sieved.

According to the invention there are also provided the improvements which comprise the addition, in the aqueous salt solution into which the crystal grains are then immersed, of sufficient quantity of silver nitrate to provide silver in the coating of copper sulfide on the phosphor particles, in an amount of from about 2 to about 12%, preferably from about 5 to about 10%, and more preferably about 8%, by weight of the copper in the coating of copper sulfide on the phosphor particles; and the addition, in the thinner for the dielectric binder, of elemental sulfur, in an amount sufficient to provide from about 0.1 to about 3%, preferably about 0.1 to about 0.3%, and most preferably about 0.2%, by weight of the dielectric binder. As noted above, if silver nitrate is added to the aqueous salt, that salt should be copper nitrate; but if not, either copper nitrate or copper chloride can be used.

The aqueous salt solution is preferably a mixture of copper nitrate and silver nitrate, such that the copper and silver ions are in a ratio ranging from 88:12 to 98:2, preferably from 95:5 to 90:10, and more preferably about 92:8, by weight. Such a solution is preferably made by mixing, for each gram of phosphor to be coated, a non-critical amount of deionized water (as little as 5 to 10 ml, or as much as 50 ml or more, depending on convenience) with 1 ml of 0.1 molar copper nitrate and 0.05 ml of 0.1 molar silver nitrate. This preferred coating solution has a molar ratio of copper:silver=20:1; or on a weight basis, contains about 8.4% silver by weight of the copper in the solution. Since the coating process replaces the zinc of the zinc sulfide on the surface of the phosphor particles with copper and silver are present in the coating solution, the result of coating with the preferred coating solution is particles which are coated with copper sulfide and silver sulfide, the amount of silver being about 8%, by weight of the copper in the coating.

The amount of elemental sulfur in the thinner is preferably enough to provide between 0.1 and 0.3 percent by weight sulfur in the display panels, by weight of the phosphor particles. It is convenient to control the amount of elemental sulfur by providing sufficient elemental sulfur in the thinner to saturate the thinner with dissolved sulfur, prior to mixing the dielectric binder with the thinner. When the thinner and solvent of the binder lacquer are evaporated, the sulfur then precipitates out and coats the phosphor particles, previously coated with copper sulfide, with sulfur.

The identity of the thinner is not critical and forms no part of the invention; however, for binders such as nitrocellulose, it is convenient to use a thinner comprising toluene, xylene, isopropanol, isobutyl acetate, acetone and methyl ethyl ketone. One such thinner was found to dissolve elemental sulfur to the extent of 15 milligrams of sulfur per milliliter of thinner.

Preferred processing is as follows. After saturating the thinner with sulfur, the excess undissolved sulfur, if any, is filtered out. Additional thinner not containing sulfur may be added if desired. Two or three parts of sulfur-containing thinner, depending on the viscosity desired, are mixed with one part of nitrocellulose lacquer to form a binder solution. Two milliliters of binder solution are then mixed with each gram of coated phosphor particles. The mixture of sulfur, thinner, binder lacquer and phosphor particles is shaken with glass beads to form a homogeneous mixture.

This mixture is then decanted from the glass beads (or filtered from them with a coarse filter which allows the phosphor particles to pass) and sprayed on the substrate (to which was previously applied tin oxide or indium-tin oxide anodes). The thinner and lacquer solvent are then evaporated, leaving the phosphor particles; from about 5 to 10%, preferably about 7%, of nitrocellulose, by weight of the phosphor particles; and precipitated sulfur. A coating of sulfur forms on each phosphor particle. The space between the sulfur-coated phosphor particles is filled with binder.

Aluminum is then evaporated onto the phosphorescent layer. The phosphorescent layer and aluminum are then scribed to form parallel stripes of phosphor elements 16, perpendicular to the anodes 14, to each of which is applied an aluminum cathode 17 (see FIGS. 1 and 2). After the phosphorescent layer and aluminum are scribed, the aluminum cathodes 17 typically extend only to the edge of phosphor elements 16. It is preferred to screen onto the cathodes metallic silver (not shown) to form bridging links between the cathodes 17 and the edge of the panel, at which location electrical contacts are more easily made.

The panel at this point is not ready to be used as an electroluminescent matrix display panel, but can be converted to one by passing a sufficient forming current through the cathodes, phosphor elements (sections of the dielectric binder and zinc sulfide:manganese particles coated with copper sulfide) and anodes to render the phosphor elements into a matrix of electroluminescent pixels. The forming procedure is known in the art, but briefly consists in passing current of 300 to 600 milliamperes per square centimeter, initially at a voltage of 10 to 15 volts, through the phosphor elements. The forming process causes the resistance of the phosphor elements to rise near the substrate, reducing the current. After the initial forming, the voltage is gradually raised and the current and power are reduced, taking care not to exceed a power of 1.25 watts per square centimeter continuously. Pulse forming, in which such power density is exceeded briefly, can be used. If this power density is exceeded for a significant time, however, there is danger of raising the temperature above the phase transition point (103° C.) of the copper sulfide present. Such transition is undesirable as it unduly increases the resistance in the phosphor elements, which would in use limit the current and achievable peak brightness.

The voltage is ultimately raised to about 60 or 70 volts, at which point a luminous film about 1 micron thick has formed adjacent the glass substrate. The panel can then be used as an electroluminescent matrix display panel.

It has been observed that there are four modes of failure of phosphor elements in electroluminescent matrix display panels. Each phosphor element in use is in effect a capacitor in parallel with a shunt resistance and in series with a series resistance. A lowering of the capacitance of the capacitor is known as "further forming," i.e., progression of the forming process beyond that desirable to cause luminescence. A lowering of the resistance of the shunt resistor is known as "softening." A rising of the resistance of the series resistor is known as "flattening of the load line." The fourth mode of failure is general chemical degradation.

The present invention has utility in controlling three of these four modes of failure. The addition of silver as described helps prevent softening and flattening of the load line. It has been found that an electrically conductive sulfur nitride polymer, $(SN)_x$, can form in the phosphor of a display panel and adversely affect the operation of the phosphor. Sulfur nitride polymer, $(SN)_x$, is described in A. G. MacDiarmid, "Synthesis and Selected Properties of Polymeric Sulfur Nitride (Polythiazyl), $(SN)_x$", Chapter 6 in R. B. King, ed., *Inorganic Compounds with Unusual Properties*, Advances in Chemistry Series, No. 150, American Chemical Society (1976); and in C. M. Mikulski et al., "Synthesis and Structure of Metallic Polymeric Sulfur Nitride, $(SN)_x$, and its Precursor, Disulfur Dinitride, $S_2N_2$, *Journal of the American Chemical Society*, 97, 6358–63 (1975). The addition of silver as described reduces or eliminates softening by catalyzing the $(SN)_x$ in the phosphor to convert it to harmless $S_2N_2$ in the presence of heat or electrical energy. The silver also prevents flattening of the load line. The addition of sulfur as described helps prevent general chemical degradation, by processes which would otherwise remove sulfur from the zinc sulfide (such as electrochemical decomposition, reaction of nitrogen to form nitrogen sulfides or oxidation to form sulfur dioxide or zinc oxide). Also, the sulfur tends to improve and maintain a desirable rise time of luminescence in relation to applied driving current.

The invention will now be illustrated with examples.

EXAMPLE 1: SILVER

The addition of silver (present on the surface of the phosphor particles as silver sulfide) in accordance with the invention, in an amount of about 8% by weight of the copper sulfide in the coating on the phosphor particles, was shown to have utility in eliminating (or substantially eliminating) both softening and flattening of the loadline.

Electroluminescent display panels were made in accordance with the invention, about 1.8 centimeters by 1.0 centimeters and containing about 1000 pixels per square centimeter, or about 1800 pixels per unit, with about 8% by weight of silver sulfide on the surface of the zinc sulfide phosphor particles. Control panels, made in a similar manner but without silver, were also made. Neither group of panels contained free sulfur in the dielectric binder. The results of testing four panels is shown below. Panels 1 and 2 contained no silver; panels 3 and 4 contained about 8% silver sulfide, by weight of the copper sulfide coating, on the surface of the zinc sulfide phosphor particles. Panels 1 and 3 were made with an "argon flush" technique, in which nitrogen, water and other impurities were cleansed from the panels with argon gas, which was flushed over the panels for two hours at 80° C., before the forming operation. Panels 2 and 4 were made with a "nitrogen flush" technique, in which dry nitrogen was flushed over the panels during the forming operation.

After the panels were formed, their operating characteristic curves were recorded graphically, recording the voltage applied and the resulting current passing through the panels. Applied voltages ranged from 0 up to the voltage necessary to cause 0.350 amperes (350 milliamps) current to flow. The panels were allowed to luminesce continuously for about 168 hours (one week), and their operating characteristic curves were again recorded graphically. The curves were analyzed to determine the amount of softening and loadline flattening which each of the four panels had demonstrated.

"Softening" is manifested by a reduction in the voltage necessary to cause a given current to flow. In the present case, the voltage at 30 milliamps was chosen as the measure of softening. "Loadline flattening" is manifested by a increase in the dynamic resistance (i.e., the increase in voltage necessary to produce a unit increase incurrent) in the operating range of the panel. In the present case, voltages to produce 30 and 350 milliamps were recorded, and the dynamic resistance (Rd) was calculated, in ohms, as the measured increase in voltage between 30 milliamps and 350 milliamps, divided by the increase in current (0.320 amps). For comparative purposes, the voltages to produce 110 at 210 milliamps were also recorded. The results are set forth in Table 1.

TABLE 1

| PANEL TESTED | VOLTS AT 0.030 AMPERES | VOLTS AT 0.110 AMPERES | VOLTS AT 0.210 AMPERES | VOLTS AT 0.350 AMPERES | Rd (Ohms) (0.030–0.350 A) |
|---|---|---|---|---|---|
| 1: no silver, argon flush (initial reading) | 77 | 84 | 90 | 97 | 62.5 |
| 1: no silver, argon flush (final reading) | 67 | 83 | 93 | 111 | 137.5 |
| 2: no silver, nitrogen flush (initial reading) | 77 | 87 | 95 | 105 | 87.5 |
| 2: no silver, nitrogen flush (final reading) | 45 | 74 | 92 | 104 | 184.4 |
| 3: with silver, argon flush | 90 | 102 | 110 | 117 | 84.4 |

TABLE 1-continued

| PANEL TESTED | VOLTS AT 0.030 AMPERES | VOLTS AT 0.110 AMPERES | VOLTS AT 0.210 AMPERES | VOLTS AT 0.350 AMPERES | Rd (Ohms) (0.030–0.350 A) |
| --- | --- | --- | --- | --- | --- |
| (initial reading) | | | | | |
| 3: with silver, argon flush (final reading) | 94 | 108 | 115 | 122 | 87.5 |
| 4: with silver, nitrogen flush (initial reading) | 98 | 111 | 123 | 132 | 106.2 |
| 4: with silver, nitrogen flush (final reading) | 104 | 120 | 129 | 138 | 106.2 |

Softening results in more current than desired flowing for a given applied voltage, so that the threshold voltage necessary to activate luminescence declines; and as a result, the panel in use exhibits undesirable background light. Softening also causes the luminous efficiency of the phosphor to degrade. Softening of the panels made without silver is measured as a decline, after 168 hours of operation, from 77 to 67 volts to result in 30 milliamps in panel 1; and a decline, after 168 hours of operation, from 77 to 45 volts to result in 30 milliamps in panel 2. By comparison, after 168 hours of operation, the voltage to result in 30 milliamps with silver present increased in panel 3 from 90 to 94 volts, and increased in panel 4 from 98 to 104 volts. This shows that silver is effective in eliminating softening.

Loadline flattening progressively increases the resistance of the phosphor, limiting the current that can be passed through the device and therefore limiting the brightness which can be produced. Loadline flattening of the panels made without silver is measured as an increase, after 168 hours of operation, from 62.5 to 137.5 ohms dynamic resistance in panel 1, and an increase, after 168 hours of operation, from 87.5 to 184.4 ohms dynamic resistance in panel 2. By comparison, after 168 hours of operation, the dynamic resistance in panel 3 increased only from 84.4 to 87.5 ohms, and the dynamic resistance in panel 4 remained at 106.2 ohms. This shows that silver is effective in essentially eliminating loadline flattening.

EXAMPLE 2: SULFUR

Panels made with 0.2% sulfur, by weight of the dielectric binder, were found to form (develop the resistance necessary to luminesce) in the shortest time. The addition of sulfur helps prevent general chemical degradation. The addition of sulfur in an amount of 0.2% by weight of the phosphor has been found to shorten the "rise time" (the time after application of current for the phosphorescent material to produce light) and to greatly extend life in a system which uses 17.5 microsecond pulses to produce light.

The features disclosed in application Ser. No. 849,768, filed Apr. 9, 1986, by David Glaser, entitled PHOSPHORESCENT MATERIAL FOR ELECTROLUMINESCENT DISPLAY, HAVING DECREASED TENDENCY FOR FURTHER FORMING; and in application Ser. No. 24,982, filed Mar. 12, 1987, by Walter L. Cherry and David Glaser, entitled ELECTROLUMINESCENT DISPLAY WITH INTERLAYER FOR IMPROVED FORMING, the disclosures of which are both incorporated by reference, are preferably used in carrying out the present invention.

In application Ser. No. 849,768, it is disclosed that dehydrating the phosphorescent material to less than 6 (preferably less than 3, or even 2) micrograms of water per gram of total phosphor and binder provides display panels which have increased useful lives and are less subject to degradation by "further forming," as compared to display panels which contain greater amounts of water. The preferred methods of dehydration are by freeze drying and by simultaneously applying heat and vacuum. It is preferred to maintain the low level of water content in the phosphor by use of a back cap.

In application Ser. No. 24,982, it is disclosed that the use of an interlayer (preferably metal oxide, such as alumina or magnesium oxide), having a uniform thickness of from 50 to 150 angstroms, preferably 100 angstroms, disposed as a sheet between (1) the anodes and substrate, and (2) the phosphor elements and cathodes, allows the panel to be formed (i.e., luminescent resistance develops) more quickly and at substantially reduced forming currents. Application Ser. No. 24,982 also discloses flushing the electrodes, interlayer and phosphorescent material with inert gas to remove nitrogen and water, and forming in an inert gas, to reduce the incidence of softening by avoiding formation of $(SN)_x$ and to avoid chemical degradation; and the use of a molecular sieve, such as an alumino silicate, as a desiccant.

Further details concerning these preferred features are given in applications Ser. Nos. 849,768 and 24,982.

Although particular preferred materials and manufacturing process steps have been described, it should be understood that the scope of the invention is not limited by this particular description. The metes and bounds of the invention are determined by the following claims and their equivalents.

I claim:

1. In a phosphorescent material for electroluminescent display, comprising:
    (a) phosphor particles of a size from about 0.1 to about 2.5 microns, comprising zinc sulfide containing from about 0.1 to about 1.0% by weight manganese;
    (b) a coating of copper sulfide on the phosphor particles; and
    (c) a dielectric binder;
the improvement which comprises the addition, in the coating of copper sulfide on the phosphor particles, of from about 2 to about 12%, of silver, by weight of the copper in the coating of copper sulfide on the phosphor particles.

2. A material according to claim 1, wherein the phosphor particles also comprise about 0.05% by weight copper.

3. A material according to claim 1, wherein the phosphor contains about 0.4% manganese.

4. A material according to one of claims 1–3, wherein the dielectric binder is organic.

5. A material according to one of claims 1–3, wherein the dielectric binder is nitrocellulose.

6. A material according to one of claims 1–3, wherein the amount of silver in the coating of copper sulfide on the phosphor particles is from about 5 to 10%, by weight of the copper in the coating of copper sulfide on the phosphor particles.

7. A material according to one of claims 1–3, wherein the amount of silver in the coating of copper sulfide on the phosphor particles is about 8%, by weight of the copper in the coating of copper sulfide on the phosphor particles.

8. A material according to one of claims 1–3, comprising in addition, in the dielectric binder, of from about 0.1 to about 3% of elemental sulfur, by weight of the phosphor particles.

9. A material according to claim 8, wherein the amount of sulfur is from about 0.1 to 0.3% by weight of the phosphor particles.

10. A material according to claim 8, wherein the amount of sulfur is about 0.2% by weight of the phosphor particles.

11. A phosphorescent material for electroluminescent display, comprising:
   (a) phosphor particles of a size from about 0.1 to about 2.5 microns, comprising
      (i) an inner portion comprising
         (1) from about 0.1 to about 1.0% manganese,
         (2) from 0 to about 0.05% copper, and
         (3) the balance zinc sulfide; and
      (ii) a surface coating of
         (1) from about 88 to about 98% by weight of copper sulfide, and
         (2) from about 2 to 12% by weight of silver sulfide;
   (b) from about 5 to about 10%, by weight of the phosphor particles, of a dielectric nitrocellulose binder; and
   (c) from 0 to about 3%, by weight of the phosphor particles, of elemental sulfur, in the dielectric nitrocellulose binder.

12. A material according to claim 11, wherein the amount of nitrocellulose is about 7%, by weight of the phosphor particles.

13. A material according to claim 11, wherein the phosphor particles contain about 0.05% by weight copper.

14. A material according to claim 11, wherein the phosphor particles contain about 0.04% manganese.

15. A material according to claim 11, wherein the amount of silver sulfide in the coating on the phosphor particles is from about 5 to 10%, by weight of copper in the coating of the phosphor particles.

16. A material according to claim 11, wherein the amount of silver sulfide in the coating on the phosphor particles is about 8%, by weight of copper sulfide in the coating on the phosphor particles.

17. A material according to one of claims 11–16, wherein the amount of sulfur in the dielectric nitrocellulose binder is from about 0.1 to about 3.0% by weight of the phosphor particles.

18. A material according to one of claims 11–16, wherein the amount of sulfur in the dielectric nitrocellulose binder is from about 0.1 to about 0.3% by weight of the phosphor particles.

19. A material according to one of claims 11–16, wherein the amount of sulfur in the dielectric nitrocellulose binder is about 0.2% by weight of the phosphor particles.

20. A phosphorescent material for electroluminescent display, comprising:
   (a) phosphor particles of a size from about 0.1 to about 2.5 microns, comprising
      (i) an inner portion comprising
         (1) from about 0.1 to about 1.0% manganese,
         (2) from 0 to about 0.05% copper, and
         (3) the balance zinc sulfide; and
      (ii) a surface coating of
         (1) from about 88 to 100% by weight of copper sulfide, and
         (2) from 0 to 12% by weight of silver sulfide;
   (b) from about 5 to about 10%, by weight of the phosphor particles, of a dielectric nitrocellulose binder; and
   (c) from about 1 to about 3%, by weight of the phosphor particles, of elemental sulfur, in the dielectric nitrocellulose binder.

21. A material according to claim 20, wherein the amount of nitrocellulose is about 7%, by weight of the phosphor particles.

22. A material according to claim 20, wherein the phosphor particles also contain about 0.05% by weight copper.

23. A material according to claim 20, wherein the phosphor particles contain about 0.4% manganese.

24. A material according to one of claims 20–23, wherein the amount of sulfur in the dielectric nitrocellulose binder is from about 0.1 to about 3.0% by weight of the phosphor particles.

25. A material according to one of claims 20–23, wherein the amount of sulfur in the dielectric nitrocellulose binder is from about 0.1 to about 0.3% by weight of the phosphor particles.

26. A material according to one of claims 20–23, wherein the amount of sulfur in the dielectric nitrocellulose binder is about 0.2% by weight of the phosphor particles.

* * * * *